United States Patent [19]
Vlahos et al.

[11] Patent Number: 5,907,315
[45] Date of Patent: May 25, 1999

[54] METHOD AND APPARATUS FOR ADJUSTING PARAMETERS USED BY COMPOSITING DEVICES

[75] Inventors: Paul Vlahos, Tarzana; Arpag Dadourian, Northridge; George Sauve, Simi Valley, all of Calif.

[73] Assignee: Ultimatte Corporation, Chatsworth, Calif.

[21] Appl. No.: 08/758,185

[22] Filed: Nov. 25, 1996

Related U.S. Application Data

[63] Continuation of application No. 08/408,119, Mar. 21, 1995, abandoned, which is a continuation of application No. 08/032,841, Mar. 17, 1993, abandoned.

[51] Int. Cl.$^6$ .................................................. G09G 5/04
[52] U.S. Cl. ..................... 345/114; 345/154; 348/586; 348/650
[58] Field of Search ........................... 348/650, 586, 348/587, 520, 577, 649, 675, 589; 345/1, 2, 3, 150, 152, 153, 154, 114, 186, 199, 431; 395/131; 358/518; 382/167

[56] References Cited

U.S. PATENT DOCUMENTS

| | | | |
|---|---|---|---|
| 4,207,589 | 6/1980 | Kawasaki | 348/649 |
| 4,344,085 | 8/1982 | Vlahos | 348/587 |
| 4,589,013 | 5/1986 | Vlahos et al. . | |
| 4,625,231 | 11/1986 | Vlahs | 348/587 |
| 4,833,462 | 5/1989 | Gover et al. | 345/145 |
| 4,857,994 | 8/1989 | Belmares-Sarabia | 358/22 |
| 4,876,657 | 10/1989 | Saito et al. | 345/1 |
| 4,885,634 | 12/1989 | Yabe | 348/71 |
| 4,907,701 | 3/1990 | Belmares-Sarabia et al. | 348/586 |
| 5,087,966 | 2/1992 | Harradine | 348/675 |
| 5,115,229 | 5/1992 | Shalit | 345/1 |
| 5,134,465 | 7/1992 | Ohki et al. | 348/649 |
| 5,313,304 | 5/1994 | Chaplin | 348/587 |
| 5,343,252 | 8/1994 | Dadourian | 348/587 |
| 5,579,031 | 11/1996 | Liang | 345/114 |

FOREIGN PATENT DOCUMENTS

| | | | |
|---|---|---|---|
| 01267590 | 10/1989 | Japan | 345/1 |
| 03279996 | 12/1991 | Japan | 345/150 |
| 04051093 | 2/1992 | Japan | 345/1 |
| 0420690 | 7/1992 | Japan | 345/150 |

*Primary Examiner*—Lun-Yi Lao
*Attorney, Agent, or Firm*—Blakely Sokoloff Taylor & Zafman

[57] ABSTRACT

The invention utilizes the fact that anyone with normal color vision has the ability look at a scene on a video display and recognize a black area if one is present; a white area if one is present, and face or flesh areas if a person is present. It is also easy to recognize blond hair, subjects that are opaque, subjects that are semi-transparent, and subjects that are bright green. The aforesaid abilities to recognize luminance and color characteristics of elements within a video scene are used in conjunction with the invention to produce ideal composite images by utilizing of a set of equations that incorporate a knowledge of color science, of video and existing compositing techniques. These equations are used to make adjustment decisions to produce the best possible composite image. The equations are used to compute certain constant values utilized in the existing compositing techniques. The equations are also used to calculate exact values of B, G, R and gamma for balancing blacks, whites, and flesh tones as well as foreground and background video levels.

35 Claims, 4 Drawing Sheets

METHOD AND APPARATUS FOR ADJUSTING PARAMETERS USED BY COMPOSITING DEVICES

This is a continuation of application Ser. No. 08/408,119 filed on Mar. 21, 1995, now abandoned, which is a continuation of application Ser. No. 08/032.841 filed Mar. 17, 1993, now abandoned.

BACKGROUND OF THE INVENTION

The concept of inserting a person or subject into a background scene to form a composite image has been practiced in the motion picture industry as far back as the 1930's. Over the years improvements have been made in image compositing using photo-chemical film mattes but this process is severely restricted in scope, subject matter, backing color purity, lighting tolerance and subject colors. It is a complex and difficult process.

The chroma-key method of compositing video images for television was developed by Kennedy and Gaskins of RCA and was published in the December 1959 issue of the Journal of the Society of Motion Picture and Television Engineers, pages 804 to 812. This simple method switched between a foreground subject placed before a blue backing, and a background scene based on the presence or absence of the hue of the blue backing. Today's chroma-key systems (even with a soft edge) still switch between the foreground and background scenes.

Chroma-key is reasonably satisfactory for television newscasts when the subject is opaque and has well-defined edges. However, it is less satisfactory for television and is totally unacceptable for motion pictures when the subject includes loose hair, fog, smoke, motion blur, glassware, window reflections, out-of-focus objects, and other semi-transparent subjects. In these subjects, both the foreground and background elements occupy the same area and therefore there is no appropriate place to switch.

The proper reproduction of these semi-transparent areas requires an "AND" concept as opposed to the "OR" concept of a switch. The simulation of reality demands that everything seen by the camera, with the exception of the blue backing itself, must be reproduced in the composite, at full level, without attenuation, and at the full resolution of the camera.

A compositing method that does all of the above is based on the "AND" concept. It does not switch between the two scenes but, rather, adds the background scene to the foreground scene as a linear function of the luminance and visibility of the colored backing. The colored backing is removed by subtraction.

This compositing method was introduced to the motion picture and video industry with Vlahos U.S. Pat. Nos. 3,595,987 and 4,007,487. Subsequent improvements were added as described in Vlahos U.S. Pat. Nos. 4,100,569, 4,344,085, 4,409,611, 4,589,013, 4,625,231 and 5,032,901.

The techniques covered by the above patents form the basis for several models of compositing equipment manufactured by the Ultimatte Corporation. The current models are the Ultimatte-300, Ultimatte-45 and Ultimatte System-6.

Most recently these compositing techniques have been incorporated into a computer workstation in the form of a compositing program.

The Ultimatte compositing techniques, whether in the form of hardware or software, have achieved a level of compositing perfection such that the composite image goes undetected as a composite even under careful scrutiny. While the Ultimatte compositing techniques solve the problem of obtaining flawless undetectable composite images, its application has been limited because of its extreme complexity. Unfortunately, few operators have acquired sufficient knowledge of color science, of video and of the Ultimatte compositing techniques to achieve the image quality of which the method and equipment are capable. The complexity of the Ultimatte compositing techniques is due to the nature of color reproduction. The color spectrum is divided into three wavelength regions, designated Blue, Green and Red. All three colors are required to reproduce a full range of subject colors. One of these three colors, such as blue, must also be used for the backing but the backing must not be reproduced. This apparent contradiction requires a complex manipulation of the blue, green, red (B, G, R) color components which constitute the Ultimatte compositing techniques.

Although the Ultimatte compositing techniques are fully described in the referenced patents, a brief review will provide a basis for the invention to be described herein.

The Ultimatte process begins with the generation of a control signal $E_c$ which is used to control a number of functions. Control signal $E_c$ is proportional to the luminance and visibility of the backing. Luminance is reduced by a subject's shadow, and visibility is reduced by semi-transparent subjects and becomes zero when the subject is opaque. $E_c$, therefore, is linearly proportional to the transparency of the subject through a range of 1.0 to 0.0. $E_c$ controls the level of the background scene video as a linear function of the luminance and visibility of the colored backing. The simplified $E_c$ equation is $$E_c = (B - K_1) - K_2[\max(G,R)] \qquad \text{Eq.-1}$$

where "max" designates "the larger of".

The next step is to substitute green for blue in those areas where blue is greater than green. In such areas, the blue video channel will be carrying green video. Color substitution is achieved by causing the green video to act as a dynamic clamp so that it cannot be exceeded by blue video.

The blue backing (usually a blue paint) will have low-level green and red components. The blue clamp, keeping blue from exceeding green, causes the blue backing to become a dark gray backing, which is a necessary first step in achieving a black backing.

The color substitution of green for blue also causes color distortion. Blue eyes and green foliage become cyan colored; pink and magenta become red; and the edges of blond hair become white.

The next step is to reduce the gray backing to a black backing. If the gray backing is not reduced to black, this residual gray becomes a gray veil superimposed over the background scene.

The gray backing is reduced to black by subtracting a portion of $E_c$, equaling the residual B, G, R video in the backing area. The four controls for this purpose are Master Veil, Blue Veil, Green Veil and Red Veil.

The above procedure reduces the blue backing to a black backing without in any way affecting the foreground subject, even when that subject is a wisp of hair, a puff of steam or a reflection from a window. Since the backing is reproduced as black there is no need to switch it off. The background scene, under control of $E_c$, is then simply added to the foreground video to obtain the composite image. However, it is still necessary to deal with the various color distortions introduced by the blue clamp and by the blue backing. The blue clamp, while introducing certain color distortions, removes others.

A person wearing a white shirt standing in close proximity to a large expanse of blue backing receives secondary blue illumination from the backing which gives his white shirt a pronounced blue tint. Flesh tones take on a magenta tint. The field of the camera lens filled with blue light will cast a blue veil over the foreground subjects due to multiple internal reflections within the lens.

After the video is subjected to the blue clamp, all evidence that a blue backing was ever present is eliminated. White stays white, flesh colors stay flesh colored and any veiling effect of lens flare is eliminated.

The colors distorted by the blue clamp include blue eyes, pink, magenta, blond hair and green foliage. These are important colors and must be corrected. Such correction is accomplished by a series of color control gates. The color correction of these subjects is based on their unique spectral reflection. Blue eyes will have a spectral composition, for example, of 80 B, 70G and 60R. Note the linear progression of 80, 70, 60. Note that blue exceeds green by the amount that green exceeds red. This linear progression is characteristic of blue eyes and most pastel blue colors.

If the green-red difference is added to green, $B \leq G+(G-R)^+$ then the clamp will read B=70+(70−60)=80. The plus symbol $(\ )^+$ holds negative values to zero. With the clamp raised to 80 in this example, blue eyes will reproduce as blue, not cyan. The blue cast on a white shirt, however, is rejected because there is no green-red difference in white and the white shirt, therefore, returns to white.

In the case of pink, its initial B, G, R values may have been 50 B, 40 G, 80R, but the blue clamp holds blue to the level of green to become 40 B, 40 G, 80R. The red-green difference is 40, however, if the blue clamp is increased by about ¼ of the red-green difference $(B \leq G + ¼ (R-G)^+)$ it allows blue to rise to 50 which is the blue component needed to reproduce pink. The same logic applies to magenta, except that ½ the red-green difference is added to green.

In the case of green foliage, a typical green will contain spectral components of 20 B, 80 G, 20R. Blue light from the backing, passing through green translucent leaves, produces spectral components of 80 B, 80 G, 20R which is cyan, not green.

By limiting blue to the lower of green or red, the spectral components of foliage are returned to 20 B, 80 G, 20R. The blue clamp with the color gates becomes:

$$B \leq K\ G + K_1(G-R)^+ + K_2(R-G)^+ + K_3 \min(G,R) \qquad \text{Eq.-2}$$

Where
$K_1$=gate 1
$K_2$=gate 2
$K_3$=gate 3
min means "the lower of", $(\ )^+$ plus means positive values only and the following procedures apply:

1. K is nominally 1.0 for a white balance on white subjects.
2. $K_1$ (gate 1) is normally 1.0 for most scenes.
3. $K_2$ (gate 2) is normally zero which prevents flesh colors from taking on a magenta tint from blue spill light. If it is essential to reproduce pink or magenta, then $K_2$ must be opened part way, about ¼ for pink and about ½ for magenta. Opening gate 2 also permits blue flare to give flesh tones a magenta cast. It is appropriate to open gate 2 just sufficient to produce a subjectively satisfying pink or magenta and thereby minimizing the degree to which flesh tones take on a magenta tint.
4. $K_3$ (gate 3) permits blue to be limited to the lower of green or red. Since green foliage will have a high blue content due to the blue back-light, it turns cyan. Gate 3, holding blue to red, restores foliage to its natural green color. However, the use of gate 3 requires that K and $K_1$ first be reduced to zero since either will defeat gate 3.

Other problems in compositing also arise and need correction. A composite, if it is not to reveal that it is a composite, must have similar elements in the two scenes match each other. For example, black areas in the foreground scene should match the color of black areas in the BG scene; white areas should match and flesh tones should match.

On the Ultimatte System-6, and its software equivalent, the foreground video and background video each have B, G, R offset controls, B, G, R gain controls and B, G, R gamma controls for a total of 18 controls. The offset, level and gamma controls are interactive and the adjustment of one may require an adjustment of the other two which, in turn, may require readjustment of the first control. Generally, an operator may go through several iterations before he is satisfied, or before he tires of trying.

A given element in two scenes may require balancing in hue-only, or in both luminance and hue. Black glossy objects reflect the blue backing and result in the background scene showing through the black object even though it is fully opaque. It is made non-transparent by means of a "Black Gloss Control".

Since $E_c$ is set to zero for gray scale subjects, light blue subjects, such as blue eyes, become transparent and must be corrected by increasing matte density. Black edging on warm colors (e.g., flesh tones) is corrected by a Matte Density Balance Control. Altogether the current Ultimatte System-6 has 98 controls consisting of 25 switches and 73 increment/decrement adjustment controls. When properly adjusted, the composite scene cannot be detected as a composite even by most video professionals.

The problem is that there are very few operators who have acquired sufficient knowledge of color science, of video, and of the Ultimatte compositing techniques, to be able to make the adjustments necessary to achieve flawless composites.

In an attempt to reduce the problem, later Ultimatte devices (U.S. Pat. No. 4,625,231, etc.) incorporate automatic circuits for setting background and foreground levels, for setting bias and for setting initial matte density. These adjustments are all subject independent. In addition, a "Reset" button returns all 98 adjustments to a default setting that will produce a good composite when the foreground and background cameras were properly balanced for white, black, and gamma and where lighting was ideal and there were no problems with the subject, wardrobe, floor glare, etc.

Such ideal conditions rarely exist. The default settings therefore provide a good starting point, but there is no way to fully automate those adjustments that are subject dependent. The automatic adjustments shorten the adjustment process but they do not substitute for a knowledgeable and skilled operator. Considering the sheer number of adjustments, and the fact that some are interactive, even a skilled operator can take up to one hour to make the necessary adjustments on a difficult scene. Operators with less expertise may never achieve a good quality composite image.

The high resolution required by the motion picture industry often utilizes non-real-time compositing. A frame of film may be scanned at resolutions up to 4000 lines in a time of 1 to many seconds. This video signal is then inputted to a computer and associated monitor for various modifications, including color correction, and is subsequently printed back to film on a second scanner. Film compositing by the computer in a workstation such as the Silicon Graphics, is made possible by expressing the equations utilized by the Ultimatte techniques in the computer language used by the workstation. Compositing is therefore one additional function of the workstation.

Substitution of the computer in place of the Ultimatte hardware increases compositing difficulties since each adjustment is delayed by the computer from about 1 second to as much as 1 minute before the operator can see the result of his adjustment. The amount of the delay depends upon the power of the computer and the pixel density (resolution) of the image.

The lack of real-time feedback makes the Ultimatte techniques almost unusable in such systems.

The Ultimatte compositing techniques utilize a series of equations using the independent variables B, G, R. These variables are scaled by constants K $K_1$ $K_2$ $K_3$ $K_4$ (1−K), etc. Scaling is achieved by an operator turning a potentiometer in analog equipment, a shaft encoder in digital equipment, or by a cursor or keyboard on a digital computer. Adjustments are intuitive and are judged to be proper as one observes the image on a video display. This is the current state of the art in video compositing.

SUMMARY OF THE INVENTION

Since no two scenes are ever exactly alike, each blue backing scene presents a different set of parameters that require adjustment in order to achieve optimum results.

The key to the solution of the skilled operator problem lies in the realization that any person, skilled or not, can look at a scene and recognize a black area if one is present; a white area if one is present, and face or flesh areas if a person is present. He can also recognize blond hair, subjects that are opaque, subjects that are semi-transparent, and subjects that are bright green.

Everyone with normal color vision has this ability, especially those technicians employed in the video or film industry. It is only this simple ability to recognize obvious elements in the scene that will be used in conjunction with this invention to produce ideal composite images.

This invention utilizes a set of equations that incorporate a knowledge of color science, of video and of the Ultimatte compositing techniques. These new equations are utilized in the present invention and make adjustment decisions to produce the best possible composite image. These equations need only the data that is subject dependent. It can be readily supplied by an unskilled operator placing his cursor on areas in the scene as requested by a message on the video monitor.

The present invention utilizes a series of equations that compute exactly the necessary "K" values in the compositing techniques described earlier. The equations of the present invention also calculate exact values of B, G, R and gamma for balancing blacks, whites, and flesh tones as well as foreground and background video levels.

DETAILED DESCRIPTION OF THE INVENTION

The present invention permits the use of an operator who has no knowledge of color science, no knowledge of the Ultimatte techniques and little knowledge of video, to sit before an image display and produce ideal composite images fully equal to those produced by skilled operators, and in a fraction of the time.

Figure 1A:
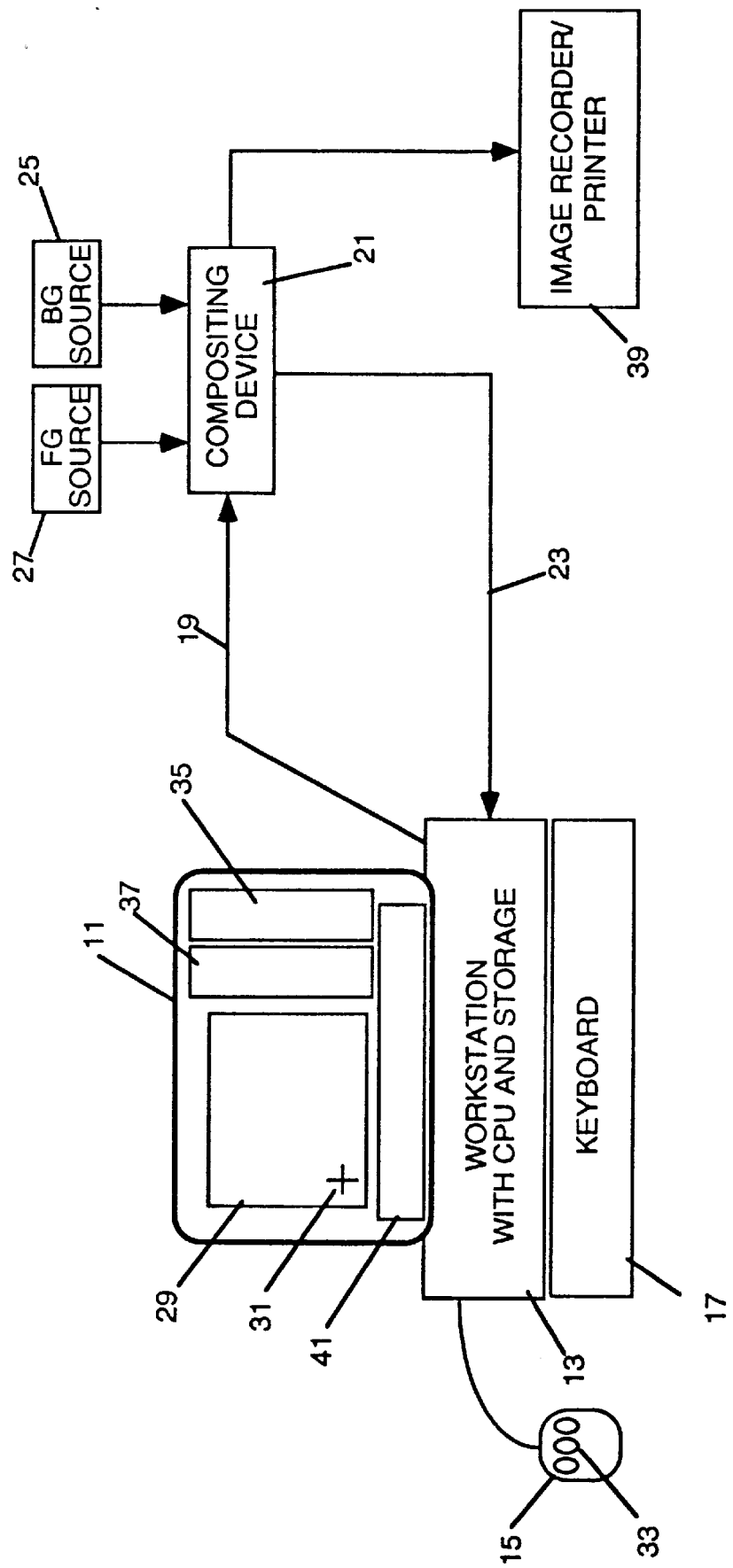
FIG. 1a is a block diagram illustrating the invented system used in combination with a separate compositing device.

FIG. 1a shows the elements of the invented system which utilizes the invented method. A monitor 11 is controlled by a workstation 13. The workstation typically has two input devices namely, a mouse 15 and keyboard 17. The workstation includes two interface boards (not shown), one for providing a bus 19 to a compositing device 21 and the other for receiving a composite video signal 23 from the compositing device. The composite signal is a composite formed by the compositing device from a background source 25 and a foreground source 27. The composite signal is displayed on the monitor 11 in a window 29 as a composite video image.

The unskilled operator need only be shown that moving the mouse moves a cursor 31 on the display, and that the mouse has three buttons 33 for ENTER, ADVANCE, and HELP. Pressing ENTER provides the requested data.

The second button ADVANCE is pressed when the requested item is not present.

The third button HELP is pressed when one might not understand the request. This third button replaces the image in window 29 with text that provides sufficient information to make the request understandable. For example, the request might use the term magenta. If this term is not understood, the text offered by button 3 would explain that magenta means purple (and that cyan means a blue-green turquoise color).

On one edge of the image display is a second window 35 in which are listed additional options including:

CANCEL: So that the operator can do a step over again if an error was made.

GO BACK: Return the display to the preceding step.

RETURN: Returns the display back to the image displayed before asking for help. With the provided information, the operator is ready to composite images.

Between the window 35 and window 29 is a third window 37 which is a RGB graphical or numeric display to provide the operator with visual feedback of adjustments being made.

It should be recognized that the instructions to the operator may differ depending upon the computer or work-station employed. The cursor mouse may have only one or two buttons, or it may be replaced by a track ball or by a keyboard. In fact, all of the functions that may be operated by mouse buttons can be listed on one edge of the display and selected by the cursor.

Figure 1B:
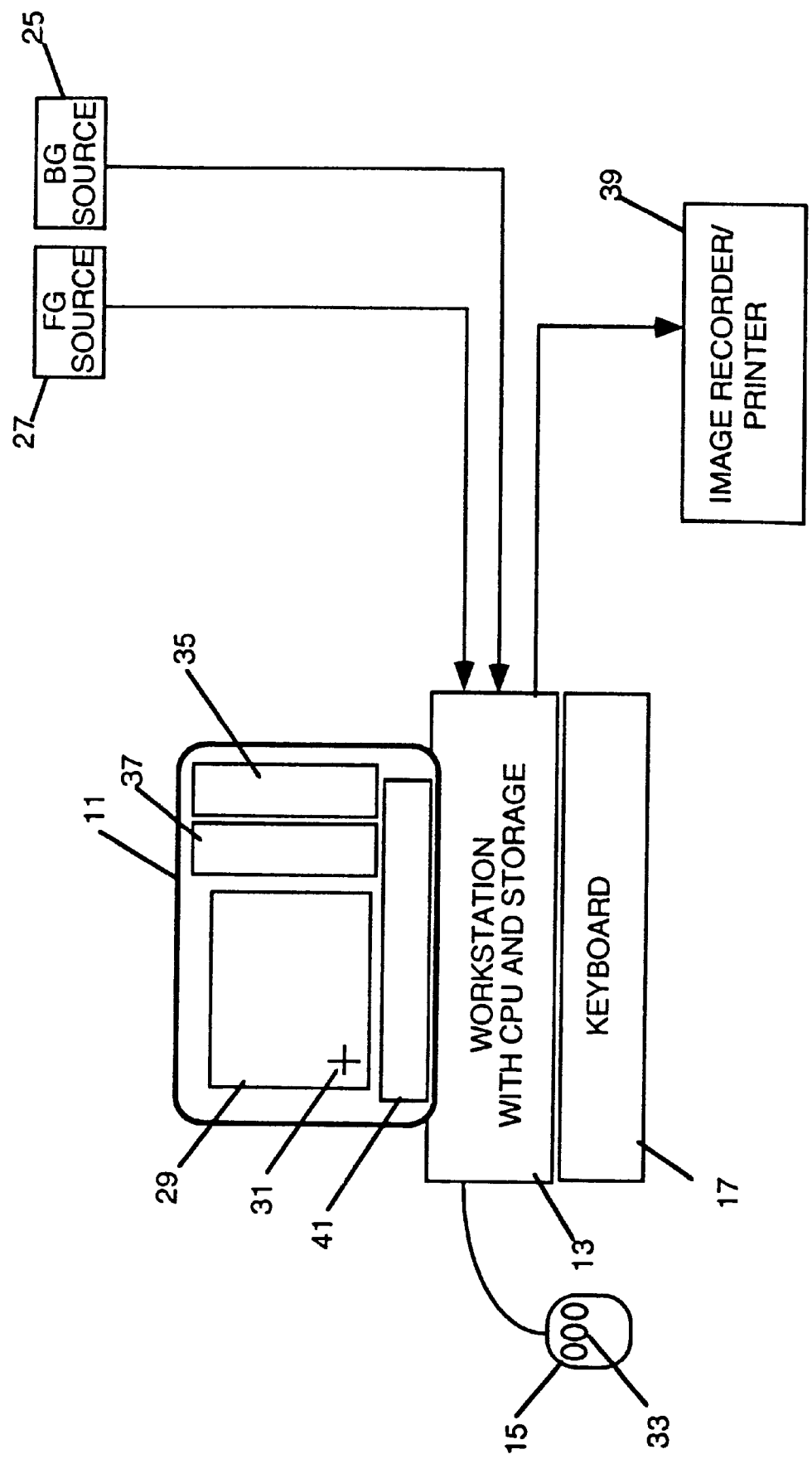
FIG. 1b is a block diagram illustrating the invented system used where the compositing is performed using software in a workstation.

FIG. 1b is similar to FIG. 1a except that there is no compositing device 21. In this system, the compositing is performed using software executing in workstation 13. Both FIGS. 1a and 1b show the use of a recording device 39 for recording the composite image. When the input video is from high resolution film, recorder 39 is usually a printing film scanner.

In any compositing operation there is a desirable sequence in which the equations composite and color balance the images. Motion pictures and many of the television shows and commercials that employ composited scenes are photographed on film, then transferred to video to permit compositing to be done in post-production. Color corrections to the background scene, if needed, are made during transfer. Of the two scenes the background scene is therefore most likely to be correct; and, also, because it was not color contaminated by the presence of an illuminated backing. The background scene can be identified as the "first" scene. The foreground scene, therefore, becomes the "second" scene. The subscripts in $B_1$ $G_1$ $R_1$ and $B_2$ $G_2$ $R_2$ designate the first and second scenes in the equations. However, either scene may be designated as the "first" scene.

Figure 2:
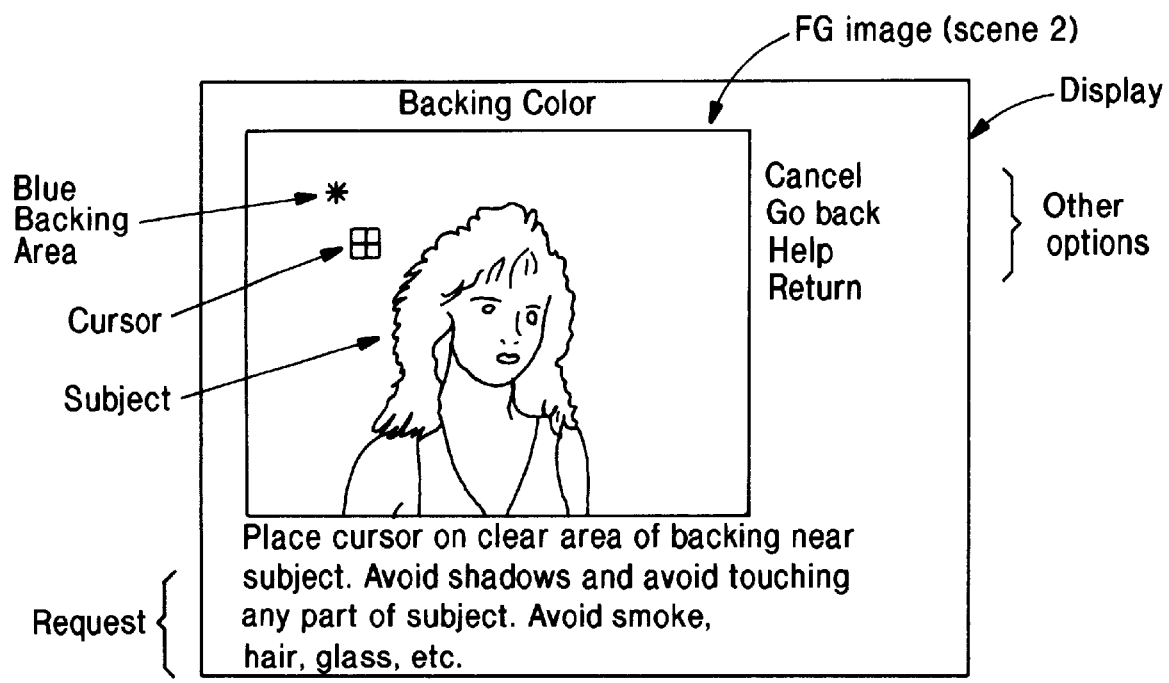
FIG. 2 is a sample display on a video monitor of a foreground image and prompts provided to an operator.

A typical sequence for employing the present invention to control the Ultimatte compositing techniques begins by displaying the foreground camera image (subject against blue backing) on a color display. The display may be a conventional video monitor or any other form of image display. Also displayed is the function being performed and other pertinent information such as shown in FIG. 2. Having placed the cursor as requested, and pressing the ENTER key, the B, G, R video levels in the area selected by the cursor are placed in memory. These B, G, R levels are then compared with the constant 0.5:

If the level of B, G or R is greater than 0.5, it is considered as 1.0; if lower than 0.5, it is considered as 0. A backing of 0.8, 0.8, 0.4 would be 1, 1, 0.

When compared with Table 1, a 010 matches green. A 100 would be blue, etc. The color of the backing is then determined from Table 1.

A second method is to list the color options on the display. The color of the backing that the operator observes is selected by placing the cursor on the listed color.

Once the backing color is identified, the proper logic for the color gates and color substitution clamp are automatically selected for that color. The logic equations for the listed colors are provided in the referenced patents. For the purpose of explaining this invention, a blue backing is used in the description and equations.

TABLE 1

| | VIDEO LEVELS | | |
|---|---|---|---|
| Backing Color | B | G | R |
| Blue | 1 | 0 | 0 |
| Green | 0 | 1 | 0 |
| Red | 0 | 0 | 1 |
| Black | 0 | 0 | 0 |
| White | 1 | 1 | 1 |

The next logical step is to select a clear area of the backing where the background scene is to be enabled at full level. This is the point where $E_c$=1.0 and is also the clip point for $E_c$ so that in an area where $E_c$ would tend to be greater than 1.0, it is clipped to 1.0. A separate data entry from the backing is not required since the clear backing area requirement was met in the preceding step.

The unabridged $E_c$ equation is:

$$E_c = \{K(B-K1) - K2 \max (K3G, K4R) - \max[K5 (G-R), K6(R-G)]\}^+ \qquad \text{Eq.-3}$$

For the purpose of explaining each of the control parameters various K constants are made 1.0 or zero to remove terms that are not involved in calculating a given constant. The first constant to be determined is K2, the matte density, for achieving a zero Ec for grey scale subjects when B G R are equal to each other.

$$Ec = B - K_2 \max (G, R) = 0 \qquad \text{Eq.-4}$$

Therefore, $K_2 = B/\max (G,R)$; $K$, $K_3$, $K_4$-1; $E_c$, $K_1$, $K_5$, $K_6 = 0$  Eq.-5

While K2 could simply be set to 1.0, it is better to compute K2 since B and max (G,R) may not be exactly equal due to minor errors in camera color balance, or in lighting units.

The cursor is placed on a white or grey scale subject to obtain its B G R video levels from which K2 is computed using Eq.5. Setting K2 to the above computed value automatically sets $E_c$ to zero for grey scale objects.

When completing this function, the display is switched to show the $E_c$ matte signal as a black silhouette of opaque subjects against a white field. If there are no subjects in the scene bluer than white [B≦max (G, R)], and if there are no black glossy objects reflecting the backing, then the matte signal (black silhouette of the subject) is fully black and without holes.

Typically, the presence of bluish subjects and black glossy subjects will create holes in the matte, where the white field shows through these areas of the silhouette.

Figure 3:
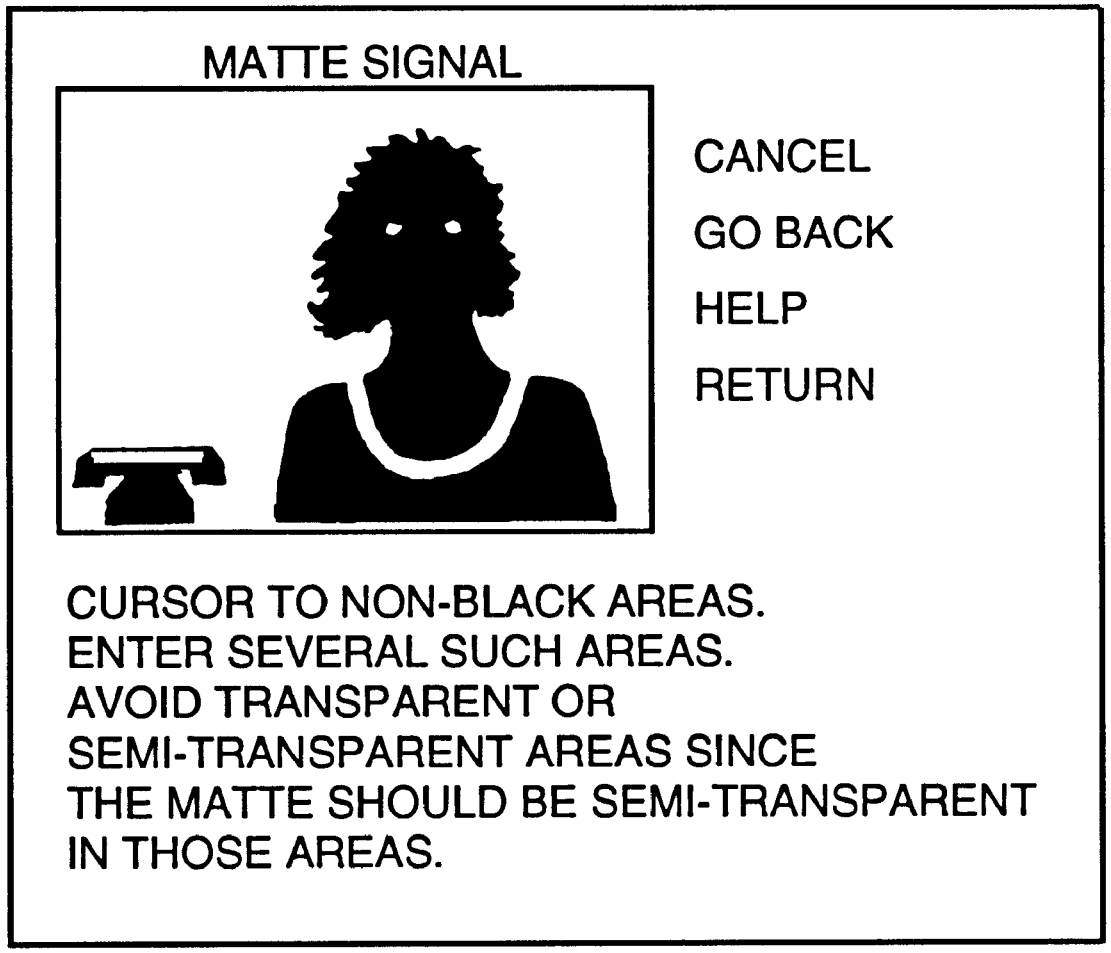
FIG. 3 is a sample display on a video monitor of a matte signal and prompts provided to an operator

FIG. 3 is a silhouette matte obtained from a blue-eyed girl wearing a white blouse with a pale blue collar. Next to her is a black glossy telephone. Note that the blue eyes, blue collar, and black telephone do not produce a fully dense (black) matte. Unless corrected, the background scene will be visible through these areas.

The B, G, R video levels from each non-black area within the silhouette are placed in memory using the cursor. These levels are divided into two categories, 1) those areas where blue was less than approximately 0.4 (the telephone) and 2) those areas where blue was greater than approximately 0.4 (blue eyes, blue collar).

Since $E_c = (B-K_1) - K_2 [\max (G,R)]$, raising $K_2$ has little effect when green and red are both near zero as in the case of the black telephone. For such objects, $K_1$ is raised (from zero) thereby reducing $E_c$ to zero for the black telephone (i.e., a negative offset) while keeping $E_c$ a constant 1.0 in the clear backing area.

Using the B G R data in memory, the B G R data having the greatest blue content, but less than 0.4, is selected for use in the equation K1=B−K2 max (G, R), where K2 is a fixed constant determined by the preceding step. When K1 is set to the value calculated from the above equation, $E_c$ is reduced to zero for black glossy objects reflecting the backing.

In the above equation, the hole in the matte for high-luminance blue areas, such as blue eyes and pale blue wardrobe, is corrected by raising $K_2$ slightly to achieve an $E_c$ of zero.

Having separated the holes in the matte as a function of which type of correction is needed, the correction for black reflection is the algorithm: $K_1 = B - K_2 \max (G,R)$. Correction for light blue areas is $K_2 = (B-K_1)/\max (G,R)$.

$E_c$ may also be brought to zero by an offset to $E_c$ in the above $E_c$ equation for black, and a reduction of blue gain in the $E_c$ equation for high-luminance blue.

There is an alternative to arbitrarily sorting black reflective objects from pastel blue objects on the basis of its blue level. It may also be done, and more accurately, by determining the B/G and G/R ratios of the backing colors. All black objects that reflect the backing will have the B/G and G/R ratio of the backing, while pastel blues will have B/G and G/R ratios that do not match the backing. The determination of which correction to apply (i.e., offset or gain) is determined by the color ratio. Since the B, G, R levels for the backing were placed in memory at an earlier step, it is a simple computation to determine these ratios. Color ratio is therefore a more accurate criteria of what is a backing reflection and what is not.

Due to minor variations in the color of the backing lighting, an acceptance window, extending a little above and below the calculated B/G and G/R ratios is used as the color ratio of the backing. In equation 5, light or bright blue objects can be matted by raising $K_2$ above unity. When this is done, the matte signal ($E_c$) will reach zero for gray scale subjects before the scanning spot has completed the transition from the backing to the subject. Being zero, $E_c$ has shut off the background video before the scanning spot is fully onto the subject, leaving gray scale subjects with a dark edge.

For bright blue subjects, alternatively the operator is asked for a data entry (cursor position) on an object that is gray or white. $E_c$ is set to zero for this subject by using the equation $K_2=(B-K_1)/\max (G,R)$ to set $K_2$, which will be approximately 1.0. The operator is then asked for a data entry for a bright blue subject. This B, G, R data is used to set $K_5$ with the equation:

$$K_5=[(B-K_1)-K_2\max (G,R)]/(G-R)$$

This equation permits an $E_c$ of O for bright blue subjects without raising $K_2$ above unity, thus preventing a dark edge to gray scale subjects.

In the case of a bright blue object having a magenta tint (violet), red will exceed green. To achieve an $E_c$ of zero for such colors, without raising K2 above unity, the term K6(R−G) in Eq.-3 is used. Note that the whole term is max [K5(G−R), K6(R−G)]. In this expression, if G is greater than R, the K6 element is low and therefor drops out. When R is greater than G, the K5 element is low and therefor drops out, thus leaving only the K6 element. Both elements are therefor independent and function in the same scene, K5 for blue objects and K6 for violet objects, and each are set separately.

K6 is set by the equation:

$$K_6=[(B-K_1)-K_2 \max (G,R)]/(R-G),$$

in which K1 and K2 have been set in the preceding steps.

The constants K1 K2 K3 K4 K5 K6 are all provided to achieve an Ec of zero for opaque subjects without raising K2 above unity. These constants all achieve an Ec that just reaches zero. Whenever Ec drops below zero, it is clipped at zero. However, the fact that it would have been negative means that it reaches zero before the scanning spot has cleared the backing.

In equation 3, the constants K3 and K4 have been added to keep green and red subjects from developing a dark edge.

In the equation Ec=B−max (G, R), a flesh tone will have B G R values of B20 G25 R70 for example. Using these numbers in the equation produces an Ec of −50. This means that when the scanning spot is about half way onto a persons face, Ec reaches zero and shuts off the background scene. Since the background scene was shut off too soon, a dark line appears around the persons face, arms and hands.

In the term K2 max (K3G, K4R), from Eq.-3, K3 and K4 are not independent. One must observe the scene and decide whether a reddish subject (person) or a green subject is of major importance to the scene.

For a green object, K3 is reduced until K3G is equal to or less than R. For a reddish subject, K4R is reduced until it is equal to or less than G. By this means the dark line bordering the subject is eliminated. When the foreground scene subjects do not contain a significant blue component, both K3 and K4 may be reduced to the level of that blue component.

In equation 3, each of the constants are named and are automatically calculated and set for each compositing step.

K=Background level
K1=BG=Black gloss
K2=MD=Matte density
K3=GD=Green density
K4=RD=Red density
K5=D1=Blue subject matte
K6=D2=Violet subject matte When any two scenes are photographed at different times with different film and different lighting, the colors in the first scene rarely match the colors in the second scene. These colors must match if the two scenes are to match. Most important is the match of black areas, white areas and flesh tones. When these three elements match in color, both scenes appear to match for all colors. While some mismatch may be tolerated in scenes in sequence, when two scenes are composited into a single composite scene, any significant mismatch destroys the single scene illusion.

APPLICATION OF COLORED SECONDARY ILLUMINATION

Subjects in a natural environment receive illumination from that environment. It may be an outdoor scene which receives its illumination from the sun and sky. Or it may be an indoor scene illuminated by artificial light.

In a composite scene, the foreground subject is placed before a colored backing. The backing color is reduced to black in the Ultimatte compositing technique, and replaced by the background scene. If the composite scene is to be fully accepted as a single scene, then all objects and subjects in both scenes must appear to have existed in the same environment and both illuminated by the light in that environment.

Color systems, whether film or video, produce a neutral white (equal B, G, R) when the light source is of the color temperature for which the color system was balanced. However, the subject also receives illumination not only from the intended light sources, but also a reflected component from objects and surfaces nearby. If these nearby surfaces are colored, they will influence the color of the subject. Whatever the degree of that influence on background subjects, it will not be present to influence the foreground subject when it is photographed against the blue backing.

It is these subtle differences that tend to destroy the illusion that the scene was real. However, since the background scene is available during the compositing step, any color distortion of subject colors in the background can be incorporated into foreground subject colors as follows:

The background scene B, G, R video is integrated over the entire frame to achieve fixed numerical values for the average B, G, R video for that frame. These averaged B, G, R video levels represent both the normal white light illumination on the set as well as the secondary illumination from walls, floor, set pieces and other light sources in the scene, which may not be white. Such secondary illumination may represent only a small part of the total illumination.

By examining the averaged B, G, R video signals for the frame and subtracting the smaller signal from all three signals, the white light component is eliminated. Of course, after subtracting the smaller of average B, G, R from each of the averaged B, G, R signals, one of these signals will be a zero. Being zero, it will have no affect and can be dropped from further consideration. The remainder represents the color of the secondary illumination. It has already caused a small shift of color on the background subjects which is desirable to apply to the foreground subjects so that the foreground and background subjects are influenced equally by the secondary illumination. This may be done as follows:

Multiply the blue video of the processed foreground scene (blue backing suppressed) by the blue remainder, if any. This product represents the influence that a blue component of the secondary illumination will have on the foreground subject, which is a function of the subject's color and its reflectivity. This influence is applied by adding the above product to the foreground blue video. An identical procedure is then performed for the green and red video channels.

Applying colored secondary illumination to the foreground scene will have little or no effect on many scenes. The effect can be quite dramatic, however, when there is significant color in the secondary illumination (e.g., a red sunset, a fire scene, a brightly colored room, etc.).

As described above, the application of secondary colored illumination to the foreground video is based on an average of the entire frame whereas, in reality, the secondary illumination usually does not originate from all parts of the frame, and the signal for colorizing the foreground video may be insufficient. The corrections to be added to the foreground video may need to be increased by a factor of K.

This secondary illumination technique provides an overall colorcast to the foreground scene approximating that of the background scene, and may be implemented by the present invention using the following equations:

Corrected blue=$B_c$=B+B[Avg. B−min (Avg. B, Avg. G, Avg. R)]

Corrected green=$G_c$=G+G[Avg. G−min (Avg. B, Avg. G, Avg. R)]

Corrected red=$R_c$=R+R[Avg. R−min (Avg. B, Avg. G, Avg. R)]

In subsequent equations used by the invention, an exact color match is obtained between background and foreground areas that are black, white, or flesh colored, and differ for reasons other than secondary illumination.

CONFORMING BLACK AREAS

The next step generally preferred is to match black areas. It was previously noted that there are 18 adjustments (foreground B, G, R gain, offset, gamma; and background B, G, R gain, offset, gamma) that affect color balance, and that by manipulation of these 18 variables one may match two areas in luminance and/or hue.

If the B, G, R video levels of the two scenes are matched so that $B_1=B_2$, $G_1=G_2$ and $R_1=R_2$, the two scenes will be matched in luminance and hue, but they may not be free of color tint. By making $B_2=G_2=R_2=B_1=G_1=R_1$. The two scenes are equal in luminance and are color neutral (i.e., no hue).

Blacks, however, have a reflectivity above zero. Even black velvet has about 4 percent reflectivity. A black object will therefore reflect the hue of its environmental lighting, and it may not be color neutral. In a fire scene at night, for example, black objects in the scene will take on a yellow tint from the yellow flames in the scene. The foreground scene, photographed on a stage, will not include the fire. Since foreground subjects are presumed to be at the fire scene, the black areas in the foreground scene should also include the yellow tint of the flames.

There is the option of balancing the black area in the second scene to the black area of the first scene in:

Hue-only (not luminance and not neutral)

Luminance only (not hue and not neutral)

Hue and luminance (but not neutral)

Hue and Luminance and neutral

Hue to neutral black (but not equal luminance)

Since two objects may differ in their distances to the light source (e.g., doorway, window, etc.), luminance may not, and need not, be equal for the two objects. However, since both are presumed to exist in the same environment, their hue should match, and it will have the color tint of its environment. Hue-only is therefore the first choice for the black balance equation. The display message reads:

Black Balance

"Cursor to black area in first scene, ENTER."

"Cursor to black area in second scene, ENTER."

The operator moves his cursor to a black area in scene one, touches ENTER and repeats for scene two. Blacks are then color balanced. The correction is an offset and its equations are:

The offset to correct $B_2=B_1(G_2/G_1)-B_2$,

Corrected $B_2=B_1 (G_2/G_1)$

The offset to correct $R_2=R_1(G_2/G_1)-R_2$,

Corrected $R_2=R_1 (G_2/G_1)$

The green video levels remain unaltered.

Without the present invention, the operator must know which two of the 18 potential adjustments to make. He should not adjust $R_1$ $B_1$ $G_1$ offset controls, gain controls, nor gamma controls. He should not adjust the $R_2$ $G_2$ $B_2$ gain controls or gamma controls. He need only adjust the $R_2$ $B_2$ offset controls. Even with this knowledge, an operator would make successive trial and error adjustments until the foreground black was acceptably close to the background black.

While the invention is primarily concerned with matching color in the foreground and background scenes of a composite image, the color balance equations apply equally well to two scenes in sequence, as in a motion picture.

If for any reason the balanced elements do not appear to be balanced, there are other options. By selecting HELP, the image is replaced with a list of the other options and the conditions under which each option would be selected. For example, if after the hue balance was completed and the foreground black appeared to be too light, one would select "Option 2", with his cursor which automatically applies luminance correction. The instructions under "Option 2" would read:

Option 2: "Selecting this option balances chroma and luminance."

The equations are:

Corrected $B_2=B_2+(B_1-B_2)$

Corrected $G_2=G_2+(G_1-G_2)$

Corrected $R_2=R_2+(R_1-R_2)$

Option 3: "This option is used when blacks in both scenes are off-color and should be hue neutral."

The equations are:

Corrected $B_1=G_1$

Corrected $R_1=G_1$

Corrected $B_2=G_1$

Corrected $G_2=G_1$

Corrected $R_2=G_1$

Option 4: "Use this option when only one scene contains black and it is off-neutral (i.e., not a true black)."

The equations for scene 1 or scene 2 are:

Corrected B=G

Corrected R=G

Once a second option is selected, the results of the first and second options may be examined by a split screen view. Moving the cursor to the left or right moves the split in the image to the left and right. One may then decide which option is preferred. One may examine and compare any two of the available options in this manner.

CONFORMING WHITE AREAS

The actual color of a white subject may not be white after photography. The natural white snow in a background scene is not likely to match the white of artificial snow in the foreground scene. At the join line, where the snow of the foreground scene meets the snow of the background scene to form a continuum, they must match exactly (in hue and luminance) if one is to believe the composite is a real scene. In this instance white must balance in both hue and luminance, but the balanced white need not be color neutral (e.g., the balanced white may be a cool or warm white).

If the white of the foreground scene does not run continuously into the white of the background scene then it is appropriate to balance whites for hue-only. White balance is achieved by B, G, R gain adjustment.

The displayed message is as follows:

WHITE BALANCE

Place cursor in the box A, B, or C that best fits the foreground and background scenes.

☐ A. The white of the foreground scene extends into the BG scene, such as a snow scene.

☐ B. White objects occur in the FG scene and in the BG scene but they are separate objects (e.g., people may all wear white shirts but they are separate objects).

☐ C. There are no white objects in both scenes.

The equations for "A" causes a balance for hue and luminance as follows:

Corrected $B_2=B_2(B_1/B_2)$

Corrected $G_2=G_2(G_1/G_2)$

Corrected $R_2=R_2(R_1/R_2)$

The equations for "B" causes a balance in hue-only, as follows:

Corrected $B_2=B_1(G_2/G_1)$

Corrected $G_2=G_1(G_2/G_1)$

Corrected $R_2=R_1(G_2/G_1)$

Upon selecting "C", the program advances to the next step.

If the operator selects HELP, the text will provide additional information as to what constitutes separate objects and what to do if white objects occur in only one scene.

CONFORMING FLESH TONES

A next logical and very important step is to balance foreground and background flesh tones. Having balanced black areas and white areas, these two ends of the video-level scale are fixed. Gain and offset therefore cannot be used to balance mid-level colors without upsetting white and/or black balance.

The most important mid-range color is that of flesh tones. Flesh tones in the two scenes can be balanced to each other by means of an adjustment to B, G, R gamma. If there are no flesh tones and mid-range colors appear not to balance, they may be balanced by the same procedure as used for flesh tones.

Again, it is assumed that the flesh tones in the background scene are most likely to be correct since it did not receive color contamination from a colored backing. Either scene, however, may be selected as the reference as designated by the cursor.

The displayed message reads:

FLESH TONE BALANCE

Place cursor on applicable option; A, B, C, etc.

☐ A. Neither scene contains flesh tones, or the flesh tones look just fine as is.

☐ B. The color and luminance should be the same because the peoples, skin tones should be the same.

☐ C. The color should be the same, but not the luminance because one is closer to a window or other light source.

☐ D. The flesh colors should not be the same because:
1. The flesh color in one scene is a blond, fair-skinned person while the flesh color in the other scene is of a well-tanned person
2. In one scene the people are oriental (or black) and the people in the other scene are not
3. The flesh colors in the two scenes appear to match but they don't look right, or one scene does not have flesh tones.

If Option "A" is selected, the program switches to the next step.

If "B" or "C" is selected, a new message appears.

"In the background scene, place cursor on face, arms or body that best represents the person's flesh color. ENTER. Repeat by selecting and entering several (limit of 6) areas on face, arms or body to obtain an average flesh color. Avoid highlights such as tip of nose or bright spot on cheek. Avoid shadow areas such as under chin. Do not let cursor symbol touch hair, eyes or lips since these areas do not truly represent flesh tones."

"On the foreground scene, obtain several (up to 6) data points with the cursor for the flesh tones of the foreground subject. Press key or button to indicate data entry is complete."

The equations used by the invention then change the B, G, R gamma of the foreground video to obtain a match for hue and luminance (Option B) or hue-only (Option C).

The equation for matching hue and luminance (Option B) is:

Corrected avg. $B_2$=avg. $B_1$

Corrected avg. $G_2$=avg. $G_1$

Corrected avg. $R_2$=avg. $R_1$

The equation for matching hue-only (Option C) is:

Corrected avg. $B_2=B_1(G_2/G_1)$

Corrected avg. $R_2=R_1(G_2/G_1)$ $G_1$ and $G_2$ are unchanged.

If Option D is selected, a new message is displayed:

OPTION D

"Two Caucasians who differ in the degree of suntan will also differ in skin color and luminance. In this case, matching skin tones is not advisable. However, if either skin tone (or both) appears to be off-color, it can be matched to a standardized color as shown and listed on the edge of the screen as follows:

"Place cursor on flesh tone that needs correcting ENTER. Repeat up to six times. Place cursor on selected color patch at edge of screen and ENTER once. Repeat for flesh tones in the other scene if needed."

At the edge of the screen are the following color patches:

Fair-skinned blond, no tan

Blond or brunette, light tan

Blond, brunette, heavy tan

Olive skin (southern European)

Oriental

Colored, light skin

Colored, dark skin

Having made a selection, a correction in hue-only is made, without changing luminance. The operator may compare the selected color with the original color using the split screen technique described earlier.

The same procedure is used for other flesh tones.

An alternative to presenting the individual color patches, is a presentation of each flesh tone as a bar that exhibits a range of color and luminance. Placing the cursor at a point along the bar provides the color of the bar at that point. In either case, the selected color will be transferred and become the flesh tone color of the subject.

USING THE INVENTED METHODOLOGY

Each equation directly accomplishes a function that a skilled operator would attempt to make. In each case the equation involves such functions as add, subtract, multiply, divide, and compare. These functions may be accomplished in analog equipment by operational amplifiers, diodes, and transistors. They may also be performed in digital form either as hardwired digital circuits or in a digital computer such as the IBM-PC, Macintosh-PC or a workstation such as Silicon Graphics using the equations of the present invention.

In the digital realm, cost considerations indicate a preference for the computer as compared to digital hardware.

The Ultimatte System-6 analog compositing equipment incorporates all of the Ultimatte compositing equations. Its remote control box controls the Ultimatte System-6 by using an RS-422 interface. Because of this interface, the Ultimatte-6 can be controlled from a computer. The present invention exists in the form of a computer program and may therefore function to control the compositing techniques in an Ultimatte System-6. This is the most likely implementation of the invention for those who already own an Ultimatte System-6 and have integrated it into their systems.

It is possible to construct the present invention in analog hardware as was done for the Ultimatte System-6 compositing techniques. The flexibility of the computer, and the ease by which changes and additions can be made, causes the implementation of the present invention as well as the Ultimatte compositing techniques to be the preferred method for those already equipped with appropriate computing equipment. The software approach for the present invention is essential for non-realtime highresolution film systems.

The above-detailed examples illustrate the application of the present invention. Equations used by the present invention, together with others not specifically discussed, are listed below, using the computer program code for the various parameters of each equation. A complete list of definitions follows the equations.

Black Gloss: BG=FGB−(MD*MAX {FGG,FGR})

Matte Density: MD=(FGB−BG)/MAX {FGG, FGR}

Green Density: GD=(FGB−BG)/(MD*FGG)

Red Density: RD=(FGB−BG)/(MD*FGR)

Density 1: D1=[(FGB−BG)−(MD*MAX {FGG, FGR})]/(FGG−FGR)

Density 2: D2=[(FGB−BG)−(MD*MAX {FGG. FGR})]/(FGR−FGG)

Clean Up: The amount of Clean Up required to fully turn on the background at the given point:

BGCLEAN=(1/$E_c$)−1

FGCLEAN=BGCLEAN

Flare Controls: Gate 1 or 3 control is set to either 0, 0.5, or 1 depending on how the user answers a list of questions. There is no calculated value.

GATE 2=[WHTBAL*(FGB−{BLKBAL*(MAXVALUE−FGB)/MAXVALUE})]−[FGB−(FGB*0.75)]−[FGG*GATE13]−[GATE13*(FGG−MIN {FGG, FGR})][(1.0−GATE13)*MIN {FGG, FGR}]

Hue and Luminance conformance:

FG Black

FGBLKR=[(BGR−FGR)*MAXVALUE]/[MAXVALUE−FGR]

FGBLKG=[(BGG−FGG)*MAXVALUE]/[MAXVALUE−FGG]

FGBLKB=[(BGB−FGB)*MAXVALUE]/[MAXVALUE−FGB]

BG Black

BGBLKR=[(FGR−BGR)*MAXVALUE]/[MAXVALUE−BGR]

BGBLLG=[(FGG−BGG)*MAXVALUE]/[MAXVALUE−BGG]

BGBLKB=[(FGB−BGB)*MAXVALUE]/[MAXVALUE−BGB]

FG Level

FGLVLR=BGR/FGR

FGLVLG=BGG/FGG

FGLVLB=BGB/FGB

BG Level

BGLVLR=FGR/BGR

BVLVLG=FGG/BGG

BGLVLB=FGB/BGB

FG Gamma

FGGAMR=[(BGR−FGR)*MAXVALUE]/[(MAXVALUE−FGR)*FGR]

FGGAMG=[(BGG−FGG)*MAXVALUE]/[(MAXVALUE−FGG)*FGG]

FGGAMB=[(BGB−FGB)*MAXVALUE]/[(MAXVALUE−FGB)*FGB]

BG Gamma

BGGAMR=[(FGR−BGR)*MAXVALUE]/[(MAXVALUE−BGR)*BGR]

BGGAMB=[(FGB−BGB)*MAXVALUE]/[(MAXVALUE−BGB)*BGB]

Hue Conformance

FG Level

FGLVLR=[FGG*BGR]/[FGR*BGG]

FGLVLB=[FGG*BGB]/[FGB*BGG]

BG Level
 BGLVLR=[BGG*FGR]/[BGR*FGG]
 BGLVLB=[BGG*FGB]/[BGB*FGG]
FG Gamma
 FGGAMR=[FGG*BGR/BGG)-FGR]/[FGR*(MAXVALUE-FGR)/MAXVALUE]
 FGGAMB=[FGG*BGB/BGG)-FGB]/[FGB*(MAXVALUE-FGB)/MAXVALUE]
BG Gamma:
 BGGAMR=[BGG*FGR/FGG)-BGR]/[BGR*(MAXVALUE-BGR)/MAXVALUE]
 BGGAMB=[BGG*FGB/FGG)-BGB]/[BGB*(MAXVALUE-BGB)/MAXVALUE]

DEFINITIONS

BG The control value for Black Gloss
BGB The background pixels blue component
BGG The background pixels green component
BGR The background pixels red component
BGBLKB The control value for the background Blue Black
BGBLKG The control value for the background Green Black
BGBLKR The control value for the background Red Black
BGCLEAN The control value for background Clean Up
BGLVLB The control value for the background Blue Level
BGLVLG The control value for the background Green Level
BGLVLR The control value for the background Red Level
BLKBAL The control value for Black Balance
D1 The control value for Density 1
D2 The control value for Density 2
FGB The foreground pixels blue component
FGBLKB The control value for the foreground Blue Black
FGBLKG The control value for the foreground Green Black
FGBLKR The control value for the foreground Red Black
FGCLEAN The control value for foreground Clean Up
FGG The foreground pixels green component
FGLVLB The control value for the foreground Blue Level
FGLVLG The control value for the foreground Green Level
FGLVLR The control value for the foreground Red Level
FGR The foreground pixels red component
GATE13 The control value for Gate 1 or 3
GATE2 The control value for Gate 2
GD The control value for the drop green portion of Matte Density Balance
MAXVALUE The maximum pixel value
MD The control value for Matte Density
MINVALUE The minimum pixel value
RD The control value for the drop red portion of Matte Density Balance
WHTBAL The control value for White Balance

THE DISPLAY

The appropriate video image and message to be displayed on the video monitor is automatically selected for each step of the adjustment sequence. The image displayed may be the background scene, the direct camera foreground scene, the processed foreground (backing reduced to black), the $E_c$ matte signal (a white field with a black silhouette of the subject), or the composite image where the foreground subjects are superimposed over the background scene.

The displayed message is always subject dependent and requests B, G, R data by asking the operator to place his cursor on some part of the subject. In some cases, there are two or more processing options depending upon the subject's proximity to other subjects and upon the scene environment. In these cases two or more options are provided with a description of the conditions associated with each option. The operator, observing the scene, selects an option that best fits the request.

When in doubt, the operator may select two options. Both are displayed on the monitor by using a split screen display. The screen is split vertically. The left portion displays the left part of the first option. The right portion displays the right part of the second option.

Moving the cursor to the left or right moves the image split to the left or right. A back and forth movement of the cursor provides a quick look at both options and permits a choice of the option that provides the most pleasing image.

On one part of the video display is a listing of the B, G, R video levels as they are entered from each cursor location. As operators acquire compositing experience the numerical readout becomes increasingly meaningful.

A graphic display in the form of a bar chart can accompany the numerical B, G, R display. Such a bar chart permits a simplification of those equations used by the present invention that simply require the matching of two numbers. Such matching can be done by keyboard or by means of the cursor to lengthen or shorten one bar to match the length of another. This manual manipulation of the display avoids calculation but lengthens the time to achieve conformance, and is not practical where ratios and other more complex calculations are required.

Certain scales are also displayed with instructions on how and when to use them. For example, a scene shows a subject looking through a window at a snow-covered moonlit landscape. The subject is illuminated by incandescent lights within the room. In this composite scene, it is not possible to balance white areas because foreground and background light sources are not at the same color temperature, nor should they be.

What can be adjusted is the relative blueness of the background scene. This may be done subjectively by the use of a color temperature scale that extends, for example, from 8000° K. to 4000° K. The operator moves his cursor to change the color temperature.

The equations used by the present invention simulate a change of color temperature of the light source by maintaining the relationship B−G=G−R, as both blue and red are shifted.

Similarly, a luminance scale permits adjustment of overall scene luminance when needed to balance foreground to background luminance.

The displayed message on the video monitor may request data that does not exist in both scenes, or appears not to apply to the scene in question, or is not understood. In this case the operator requests assistance by placing his cursor on HELP.

A second level of detail is provided with explanations as to what kind of data is needed, what to look for in the subject and what to avoid. If the explanation is insufficient, the operator selects "MORE HELP".

A third level of detail explains the theory, if applicable, what the algorithm hopes to accomplish and what alternative choices are available, if any. This multi-level depth of detail permits the operator to solve problems that may be unique to the scene such as the use of windows to extend the backing area, or to block off an unwanted area.

For any given equation, the HELP and MORE HELP selections may extend the explanation to as many levels as needed.

In conforming elements of two scenes, it is assumed that one of the two scenes is correct and the second scene is then matched to the first. It has been assumed that the background scene is most likely to be correct since it was not color contaminated by the presence of a large expanse of a brightly lighted colored backing. However, either scene may be selected as the reference simply by placing the cursor thereon and entering its B, G, R data first.

Normally, the equations used by the present invention are arranged in such a sequence that the most logical next step is presented to the operator. This sequence is established so that each current equation operates on data whose prior adjustment was a prerequisite.

It is possible for the operator to select his own sequence for using the equations of the present invention by providing that option. However, the operator would then be required to have a good knowledge of the equations used by the present invention.

Since black, white and flesh tones (the three critical subject areas) are substantially different from each other, an operator error signal is easily provided. If one is balancing black areas, for example, any red or green video level above about 15 percent is a clear indication that the cursor was not on a black object. Similarly, a subject whose B, G, R levels are below 40 percent is clearly not white. A video signal where red was not clearly greater than green is not likely to be a flesh tone.

Conversely, placing the cursor on a black area could call up the proper algorithm for matching blacks (or whites, or flesh tones) since the B, G, R levels for these subjects are non-ambiguous. However, to do so would require a knowledge of equation sequence.

There are occasions when an area such as black, flesh or white occurs only in one of the two scenes and, upon examination, it appears to be off-color even though there is no corresponding black, flesh or white in the other scene by which one may make a comparison. Or, even when the selected area (e.g., black) is present in both scenes, they appear to be off-color and matching the two areas in hue, or luminance and hue does not correct the problem. In this case, one may call up a neutral reference black or white, as was discussed earlier in the case of flesh tones, and match both black and white to the neutral reference. In addition, the color temperature of the reference white and black can be increased (cooler) or decreased (warmer). The system holds the B, G, R levels such that B−G=G−R, thus holding a straight line relationship between B, G, and R. This relationship prevents any color tint outside the block-body locus.

However, since a B, G, R numerical readout occurs on the display, one may use his cursor to adjust individual B, G, R levels, if desired, in order to introduce a color tone.

There are compositing applications in which either the foreground or the background scene is computer generated. Since the algorithms operate on B, G, R video levels, the source of the video is irrelevant to the process of conforming or compositing. For the same reason, any format in which the video occurs is acceptable when converted to B, G, R video signals.

The display cursor that is used to identify subject parameters and other features may be of any suitable shape or size. It is generally preferred to use a cursor of about 5*5 pixels. These 25 pixels permit averaging, dropping the highest and the lowest pixel's video level, etc., to minimize noise.

We claim:

1. A method of automatically conforming image parameters in a second video scene with like parameters in a first video scene, said first video scene to be composited with said second video scene, comprising the steps of:
   a. displaying both scenes simultaneously on a video display, said first scene having $B_1$ $G_1$ $R_1$ video signal levels, and said second scene having $B_2$ $G_2$ $R_2$ video signal levels,
   b. prompting an operator to select a specific image parameter in the second scene and entering into a memory the $B_2$ $G_2$ $R_2$ video signal levels for said selected image parameter,
   c. promoting an operator to select a like parameter in the first video scene and entering into the memory the $B_1$ $G_1$ $R_1$ video signal levels for said like image parameter,
   d. utilizing the $B_1$ $G_1$ $R_1$ and $B_2$ $G_2$ $R_2$ video signal levels stored in said memory to correct the $B_2$ $R_2$ video signals in the second scene so that the selected image parameter in the second scene and the like image parameter in the first scene are automatically conformed in hue while luminance of the selected image parameter in the second scene and the like image parameter in the first scene is substantially maintained.

2. The method of claim 1 in which the two scenes are displayed adjacent to each other on a single monitor.

3. The method of claim 1 in which the two scenes are displayed on separate monitors.

4. The method of claim 1 in which the second video scene is a foreground scene including a subject disposed before a colored backing and where said subject is composited over said first scene to form a composite image of the two scenes.

5. The method of claim 4 in which the colored backing is replaced with one of a white backing and black backing.

6. The method of claim 4 in which the second scene is computer generated.

7. The method of claim 4 in which the first scene is computer generated.

8. The method of claim 1 in which the selection of a specific parameter and the obtaining of B, G, R video signal levels of the selected image parameter occurs when an operator responds to a displayed instruction for the placement of a cursor on said video display.

9. The method of claim 1 in which a desired sequence for conforming the image parameters is listed in the display on the display and is selected by cursor placement by an operator.

10. The method of claim 1 in which the steps required to conform a given image parameter are determined automatically by the B, G, R data first entered.

11. The method of claim 1 in which the utilizing step comprises the steps of:
   a. conforming an image parameter common to two images, where said common image parameter exhibits a low video signal level, by introducing a negative or positive offset voltage to the blue and red video signals for at least one of said two images to obtain their conformance in hue only,
   b. conforming the image parameter common to two images, where said common image parameter exhibits high video signal level, by adjusting the gain of the blue and red video signals for at least one of said two images to obtain their conformance in hue only,
   c. conforming the image parameter common to two images where said common image parameter exhibits a medium video signal level by adjusting the gamma of the blue and red video signals for at least one of said two images to obtain their conformance in hue only.

12. The method of claim 11 in which the steps of conforming the parameters of two images are made less interactive by the sequence of conforming low signal level areas first, high signal level areas second, and medium signal level areas third.

13. The method of claim 11 in which the low signal level area is a black area or low luminance color.

14. The method of claim 11 in which the high signal level area is a white area or high luminance color.

15. The method of claim 11 in which the medium signal level area is a flesh tone or medium luminance color.

16. The method of claim 11, in which the conformance steps are repeated at least two iterations to eliminate the interactive effect of adjusting said offset, gain and gamma of at least two of said image parameters.

17. The method of claims 1 or 11 in which the conformance of black areas in hue is achieved by introducing a positive or negative offset to the $B_2$ $G_2$ $R_2$ video signals such that:

Conformed $B_2=B_1*(G_2/G_1)$
Conformed $G_2=G_1*(G_2/G_1)$
Conformed $R_2=R_1*(G_2/G_1)$.

18. The method of claims 1 or 11 in which the conformance of black areas in hue-only requires a positive or negative offset to the $B_2$ $G_2$ $R_2$ video signals such that:

Conformed $B_2=B_1$ $(G_2/G_1)$
Conformed $G_2=G_1$ $(G_2/G_1)$
Conformed $R_2=R_1$ $(G_2/G_1)$.

19. The method of claims 1 or 11 in which the conformance of white areas in hue requires an increase or decrease in gain of $B_2$ $G_2$ $R_2$ video signal levels such that:

Conformed $B_2=B_1*(G_2/G_1)$
Conformed $G_2=G_1*(G_2/G_1)$
Conformed $R_2=R_1*(G_2/G_1)$.

20. The method of claims 1 or 11 in which the conformance of white areas in hue-only require an increase or decrease of video level (gain) of $B_2$ $G_2$ $R_2$ video signals that:

Conformed $B_2=B_1$ $(G_2/G_1)$
Conformed $G_2=G_1$ $(G_2/G_1)$
Conformed $R_2=R_1(G_2/G_1)$.

21. The method of claims 1 or 11 in which flesh tones are to be conformed in hue requires an adjustment to the gamma of the second scene $B_2$ $G_2$ $R_2$ video signals to result in $B_2$ $G_2$ $R_2$ video levels such that:

Conformed $B_2=B_1$
Conformed $G_2=G_1$
Conformed $R_2=R_1$.

22. The method of claims 1 or 11 in which flesh tones are to be conformed in hue only requires an adjustment to the gamma of the second scene $B_2$ $G_2$ $R_2$ video signals to result in $B_2$ $G_2$ $R_2$ video levels such that:

Conformed $B_2=B_1$ $(G_2/G_1)$
Conformed $G_2=G_1$ $(G_2/G_1)$
Conformed $R_2=R_1$ $(G_2/G_1)$.

23. The method of claims 1 or 11 in which the video levels of selected parameters of at least one of the first and second scenes is conformed to selected B, G, R numerical constants that represent neutral black, neutral white and a selected flesh tone.

24. The method of claims 1 or 11 in which the blue, green and red signal levels of selected elements of the two images are graphically displayed as in a bar chart.

25. The method of claims 1 or 11 in which the blue, green and red signal levels of selected elements of the two images are graphically displayed as in a bar chart, and conformance of said elements is achieved by matching bar lengths in the display.

26. The method of claims 1 or 11 in which the B, G, R video levels are displayed as a numerical readout, and are matched by keyboard input.

27. A method for automatically reducing the background scene control signal level $E_c$ to zero in an area of a black glossy foreground object reflecting the blue backing where said $E_c$ is obtained from the equation $E_c=(B-K_1)-K_2\max(G,R)$ comprising the steps of:

a. displaying the $E_c$ control signal as a black silhouette against a white field on a video display wherein said black object is represented by a hole in the matte silhouette, b. placing a cursor on the hole in the silhouette representing the black glossy object, c. entering the B, G, R video levels at the location of the cursor into a memory, d. setting $K_1$ to the value calculated by the equation $K_1=B-K_2\max(G,R)$, where $K_2$ is 1.0 thereby causing $E_c$ to become zero in an area of the display occupied by the black glossy object reflecting the blue backing and thus preventing the background scene from showing through an opaque black glossy subject, where $K_1$ is black gloss and $K_2$ is matte density.

28. The method defined by claim 27 wherein said cursor is positioned by operation of one of a light pen, tablet pen and mouse.

29. A method for automatically reducing the background scene control signal, $E_c$, to zero level in an area of a pale blue foreground subject whose blue color prevents $E_c$ from reaching zero where said $E_c$ is obtained from the equation $E_c=(B-K_1)-K_2\max-(G,R)$ where $K_1$ is equal to $B-K_2\max(G,R)$ in the presence of black gloss and $K_1$ is zero in the absence of black gloss, comprising the steps of:

a. displaying the $E_c$ matte signal on a video display such that the blue subject appears as a non-opaque area in the matte silhouette, b. placing a cursor on the matte silhouette in the area of the hole caused by the pale blue subject, c. entering into memory the B, G, R video levels existing at the location of the cursor, d. setting $K_2$ to the value calculated by the equation $K_2=B/\max(G/R)$, thereby reducing $E_c$ to zero and shutting off the background scene behind the blue subject, where $K_1$ is black gloss and $K_2$ is matte density.

30. A method for automatically reducing the background scene control signal, $E_c$, to zero level for pale blue and bright blue subjects disposed before a blue backing without increasing $K_2$ above its ideal value of 1.0 for gray scale subjects when $E_c$ is developed by an $E_c$ equation having the added term, $K_5(G-R)$ in the equation:

$$E_c=(B-K_1)-K_2\max(G,R)-K_5(G-R)$$

where said equation reduces $E_c$ to zero when $K_5$ is properly adjusted by the steps of:

a. displaying the $E_c$ control signal as a black silhouette of the subject against a white field wherein blue subjects produce a hole in an otherwise black silhouette, b. placing a cursor on each hole in the silhouette in the areas representing the pale blue and bright blue subjects, c. storing in memory the B, G, R video levels existing at the cursor locations, d. selecting the B, G, R signal having the greatest B−G difference, e. setting $K_5$ by the equation, $$K_5=((B-K_1)-K_2\max(G,R))/(G-R)$$

where $K_1$ is one of zero in the absence of black gloss and B–$K_2$max (G,R) when black gloss is present, and $K_2$ is substantially equal to 1.0, thereby reducing $E_c$ to zero for pale blue and bright blue subjects without raising $K_2$ above its ideal value of 1.0, where $K_1$ is black gloss and $K_2$ is matte density.

31. A method for automatically reducing the background scene control, $E_c$, to zero level for bright blue objects having a magenta tint caused by its red content exceeding its green content and obtaining said zero level for $E_c$ without raising $K_2$ above its ideal value of 1.0 by introducing the term $K_6$(R–G) in the $E_c$ equation:

$$E_c = (B-K_1) - K_2 \max(G,R) - \max(K_5(G-R), K_6(R-G))$$

where $K_1$ is one of zero and B–$K_2$max (G,R), $K_2$ is substantially equal to 1.0, and $K_5$ is zero when R–G is greater than G–R and is 1 when R–G is less than or equal to G–R, and determining $K_6$ by the steps of:

a. displaying the $E_c$ control signal as a black silhouette of the subject against a white field wherein opaque blue subjects produce a hole in an otherwise black silhouette, b. placing a cursor on the hole in the silhouette representing a bright blue subject having a magenta tint, c. storing in memory the B, G, R video levels existing at the cursor location, d. solving for $K_6$ by the equation:

$$K_6 = ((B-K_1) - K_2 \max(G, R))/(R-G)$$

e. utilizing the values of $K_6$ thus determined to result in an $E_c$ of zero (in the above $E_c$ equation) for bright blue subjects having a magenta tint, where $K_1$ is black gloss, $K_2$ is matte density, $K_5$ is blue subject matte and $K_6$ is violet subject matte.

32. A method for the computer assisted compositing of images in a linear compositing process where foreground subjects photographed before a colored backing are inserted into a background scene under control of a matte signal $E_c$ and where said $E_c$ has a value of 1.0 for the blue backing and zero for opaque non-blue subjects in the equation $E_c=K((B-K_1)-K_2\max(G,R))$ with default values of K=1, $K_1$=0, $K_2$=1, and whose correct values are obtained by proper adjustments of the constants K, $K_1$, $K_2$, where said proper adjustments are obtained automatically by computer calculation, replacing the default K values and comprises the steps of:

a) storing the scanned background scene and foreground scene video signals in a memory, b) storing an ordered sequence of cursor placement requests in said memory, c) storing an equation related to each request in which one K factor in each equation is the constant whose correct value is to be determined, d) displaying on command the first of said ordered sequence of cursor placement requests on a display monitor, together with a relevant image, e) responding to said request by manually placing a cursor, at the requested point on the displayed image, f) automatically inserting in said related stored equation the RGB data existing at the requested point on the image resulting from cursor placement thereon, g) utilizing said requested data and the stored equation associated with said request to automatically calculate the correct value of said K factor in said stored equation, h) automatically substituting the correct value for the existing value of said K factor, i) displaying selectively automatically and on command, the next data request in the ordered sequence and repeating said steps e) through i) until all ordered requests have been acknowledged and unknown values have been calculated, thereby automatically determining the correct values for each of the matte signal adjustment steps in the linear compositing process, where $K_1$ is black gloss and $K_2$ is matte density.

33. The method of claim 32 in which the matte signal is to includes the additional constants $K_3$, $K_4$, $K_5$ and $K_6$ producing the matte equation $$E_c = K((B-K_1) - K_2\max(K_3G, K_4R) - \max(K_5(G-R), K_6(R-G))),$$

where $K_3$ is green density, $K_4$ is red density and $K_5$ is blue subject matte.

34. The method of claim 33 in which K,$K_1$,$K_2$ are default values, and $K_5$ and $K_6$ are zero, and $K_3$ is 1.0 when the indicated RGB signals in the equation in which the two scenes are displayed adjacent to each other on a single monitor are obtained from a persons face, arms, or body, the value therefore of $K_4$ is automatically calculated from the equation $K_4$=G/R whereby a dark edge surrounding any object where red exceeds green is removed.

35. The method of claim 33 in which K,$K_1$,$K_2$ are default values, and $K_5$ and $K_6$ are zero, and $K_4$ is 1.0 when the indicated RGB signals in the equation $E_c=K((B-K_1)-K_2\max(K_3 G, K_4R) - \max(K_5(G-R), K_6(R-G))$ are obtained from the leaves of a green plant, the value of $K_3$ is automatically calculated from the equation $K_3$=R/G whereby the cyan color of green leaves or other green subjects where green exceeds red is returned to its normal green color.

* * * * *

UNITED STATES PATENT AND TRADEMARK OFFICE
CERTIFICATE OF CORRECTION

PATENT NO. : 5,907,315
DATED : May 25, 1999
INVENTOR(S) : Vlahos et al.

It is certified that error appears in the above-identified patent and that said Letters Patent is hereby corrected as shown below:

Column 20, claim 1,
Line 5, delete "promoting an operator" and insert -- prompting an operator --.

Column 21, claim 22,
Line 42, delete "hue only" and insert -- hue-only --.

Column 22, claim 29,
Line 26, delete "$E_c=(B-K_1)-K_2\max-(G,R)$" and insert -- $E_c=(B-K_1)-K_2\max(G,R)$ --.

Signed and Sealed this

Eleventh Day of September, 2001

Attest:

NICHOLAS P. GODICI
Attesting Officer    Acting Director of the United States Patent and Trademark Office